United States Patent
Lin et al.

(10) Patent No.: US 10,077,373 B2
(45) Date of Patent: Sep. 18, 2018

(54) POLYVINYL FLUORIDE PAINT AND BI-LAYERED COATING AND METHOD FOR MANUFACTURING THE SAME

(71) Applicant: GRAND TEK ADVANCE MATERIAL SCIENCE CO., LTD., Taipei (TW)

(72) Inventors: Hsueh-Tso Lin, Hsinchu (TW); Rui-Gang Hou, Taipei (TW); Chih-Hung Lin, Taipei (TW); Dick Zhong, Arcadia, CA (US)

(73) Assignee: Grank Tek Advance Material Science Co., Ltd., Taipei (TW)

( * ) Notice: Subject to any disclaimer, the term of this patent is extended or adjusted under 35 U.S.C. 154(b) by 189 days.

(21) Appl. No.: 15/219,756

(22) Filed: Jul. 26, 2016

(65) Prior Publication Data

US 2017/0240760 A1     Aug. 24, 2017

(30) Foreign Application Priority Data

Feb. 18, 2016 (TW) ............................ 105104712 A

(51) Int. Cl.
| | | |
|---|---|---|
| *C09D 127/14* | (2006.01) | |
| *C09D 5/08* | (2006.01) | |
| *C08L 27/14* | (2006.01) | |
| *B32B 27/00* | (2006.01) | |
| *B05D 3/02* | (2006.01) | |
| *C09D 1/00* | (2006.01) | |
| *C09D 7/48* | (2018.01) | |

(52) U.S. Cl.
CPC ......... *C09D 127/14* (2013.01); *B05D 3/0254* (2013.01); *C09D 1/00* (2013.01); *C09D 5/08* (2013.01); *C09D 7/48* (2018.01)

(58) Field of Classification Search
CPC .............................. C09D 127/14; C08L 27/14
USPC .............. 428/422; 427/407.1; 524/546, 431
See application file for complete search history.

(56) References Cited

U.S. PATENT DOCUMENTS

| | | | | |
|---|---|---|---|---|
| 2,953,818 A | | 9/1960 | Bartron | |
| 3,139,470 A | | 6/1964 | Prengle | |
| 4,557,977 A | * | 12/1985 | Memmer | B05D 7/16 427/379 |
| 4,786,546 A | | 11/1988 | Vassiliou | |
| 5,330,850 A | * | 7/1994 | Suzuki | C25D 3/565 428/623 |
| 5,753,316 A | * | 5/1998 | Brent | B05D 7/14 427/379 |
| 2012/0231379 A1 | * | 9/2012 | Nukada | G03G 5/0525 430/56 |
| 2014/0113144 A1 | * | 4/2014 | Loth | C09D 5/1662 428/421 |
| 2015/0267061 A1 | * | 9/2015 | Huesmann | B05D 3/007 428/418 |

FOREIGN PATENT DOCUMENTS

| | | |
|---|---|---|
| CN | 100451067 | 1/2009 |
| CN | 104812836 | 7/2015 |

OTHER PUBLICATIONS

Guoxing Xu, "Three general inner coating materials of steel barrel in China", Sep. 2, 2011, 11 pages.
Office Action from the corresponding Taiwanese application, dated Aug. 3, 2016, 8 pages.

* cited by examiner

*Primary Examiner* — Tae H Yoon
(74) *Attorney, Agent, or Firm* — Muncy, Geissler, Olds & Lowe, P.C.

(57) ABSTRACT

A method of manufacturing a bi-layered coating is provided, which includes applying a primer paint on a substrate, wherein the primer paint includes 100 parts by weight of a first polyvinyl fluoride, 20 to 50 parts by weight of an assistance resin, and 150 to 170 parts by weight of a first latent solvent, and wherein the assistance resin is polyester modified epoxy resin, polyester type polyurethane resin, phenoxy resin, or a combination thereof. The primer paint is baked and dried to form a primer coating. A finish paint is then applied onto the primer coating, wherein the finish paint includes 100 parts by weight of a second polyvinyl fluoride and 120 to 150 parts by weight of a second latent solvent. The finish paint is baked and dried to form a finish coating on the primer coating.

10 Claims, No Drawings

POLYVINYL FLUORIDE PAINT AND BI-LAYERED COATING AND METHOD FOR MANUFACTURING THE SAME

CROSS REFERENCE TO RELATED APPLICATIONS

This application claims priority of Taiwan Patent Application No. 105104712, filed on Feb. 18, 2016, the entirety of which is incorporated by reference herein.

BACKGROUND

Technical Field

The disclosure relates to a paint, and in particular it relates to a polyvinyl fluoride paint for a coil.

Description of the Related Art

A substrate may be a pre-coated coil such as a cold rolled steel coil, a zinc coated steel coil, or an aluminum sheet after a surface treatment, a continuous roller coating, baked, and cooled. Pre-coated coils are widely applied in the field of architecture due to their many advantages, which include an aesthetic appearance, a uniform coating film, a bright color, a high intensity, and an easy process for shaping. Paint for the coil should meet the requirements of coating toughness, excellent climate resistance, and adhesion. The coil paints that are available on the conventional market are polyester system paint, acrylic acid amino paint, and PVC paint. While the requirement such as the coil endurance is increased along time, the fluoro-carbon paint with high gloss retention, high color retention, and super long term climate resistance is recognized in the coil coating. Polyvinylidene fluoride (PVDF) paint is the most popular sort of fluoro-carbon paint due to the mature technology behind it, and the fact that it was marketized earlier than the other options. In general, PVDF paints may be classified as either a primer paint or a finish paint. The resin of the PVDF finish paint is not 100% PVDF resin, which includes 30% acrylic acid resin and 70% PVDF to increase the film formability and adhesion of the PVDF. Because the PVDF finish paint contains 30% acrylic acid resin, it forms a hard coating when serving as a paint on a steel coil. As such, the coating cracks easily in the post process of the steel coil. The steel coil coated with the PVDF has a problem wherein the coating may crack in a 1 T folding endurance test, which reduces the corrosion resistance and the chemical resistance of the coating. Accordingly, the PVDF coating is not suitable to serve as a protective coating film for metal in an application that requires higher corrosion and chemical resistance.

Polyvinyl fluoride (PVF) has excellent acid and alkaline resistance, outstanding photo stability, anti-oxygen properties, climate resistance, and is waterproof. The major application of the PVF for the coil is a PVF (Tedlar® developed by Dupont) film covering the coil. However, the above application needs two processes, such as film formation of the PVF and covering the film on a substrate, thereby increasing the manufacturing cost. A PVF paint made of the PVF resin also has excellent physical, chemical, and mechanical properties, such as climate resistance, UV resistance, acid and alkaline resistance, impact resistance, flexibility, and abrasion resistance. What is called for is a PVF paint for application on a coil, wherein the PVF paint should achieve the 0 T folding endurance test standard (e.g. the coating does not crack) after the processes, enhance the post processability of the coil, and further serve as a protective coating film for metal in an application that requires higher corrosion and chemical resistance.

BRIEF SUMMARY

One embodiment of the disclosure provides a polyvinyl fluoride paint, comprising: 100 parts by weight of a polyvinyl fluoride, 20 to 50 parts by weight of an assist resin, and 150 to 170 parts by weight of a latent solvent, wherein the assist resin is polyester modified epoxy resin, polyester type polyurethane resin, phenoxy resin, or a combination thereof.

One embodiment of the disclosure provides a A bi-layered coating, comprising: a primer coating including 100 parts by weight of a first polyvinyl fluoride and 20 to 50 parts by weight of an assist resin, and a finish coating including 100 parts by weight of a second polyvinyl fluoride, wherein the assist resin is polyester modified epoxy resin, polyester type polyurethane resin, phenoxy resin, or a combination thereof.

One embodiment of the disclosure provides a method of forming a bi-layered coating, comprising: applying a primer paint on a substrate, wherein the primer paint includes 100 parts by weight of a first polyvinyl fluoride, 20 to 50 parts by weight of an assist resin, and 150 to 170 parts by weight of a first latent solvent, and wherein the assist resin is polyester modified epoxy resin, polyester type polyurethane resin, phenoxy resin, or a combination thereof; baking and drying the primer paint to form a primer coating; applying a finish paint on the primer coating, wherein the finish paint includes 100 parts by weight of a second polyvinyl fluoride and 120 to 150 parts by weight of a second latent solvent; and baking and drying the finish paint to form a finish coating on the primer coating.

A detailed description is given in the following embodiments.

DETAILED DESCRIPTION

The following description is of the best-contemplated mode of carrying out the disclosure. This description is made for the purpose of illustrating the general principles of the disclosure and should not be taken in a limiting sense. The scope of the disclosure is best determined by reference to the appended claims.

In one embodiment, a method of forming a bi-layered coating is provided, which includes applying a primer paint on a substrate. The substrate can be a coil such as a cold rolled steel coil, a zinc coated steel coil, an aluminum-zinc alloy coated steel coil, or an aluminum sheet. The primer paint includes 100 parts by weight of PVF, 20 to 50 parts by weight of assist resin, and 150 to 170 parts by weight of latent solvent. In one embodiment, the primer paint is prepared as described below. The PVF resin powder, the assist resin, the latent solvent, another solvent collocated with the latent solvent (optional), another auxiliary agent (optional), pigment (optional), and filler (optional) are mixed together, stirred at a high rate to be evenly dispersed, and then ground by a grinder with a cooling device until the paint has a fineness≤10 μm (this usually takes 4 hours). A solvent other than the latent solvent is optionally (not necessary) added to the paint for tuning the paint viscosity to be suitable in a coil coating process (e.g. 60 to 80 seconds with a No. 4 Ford cup). At last, the paint was filtered by a filtering sieve of 400 mesh.

In one embodiment, the PVF can be Tedlar TPVF 116 commercially available from U.S. Company Dupont. The assist resin is polyester modified epoxy resin, polyester type polyurethane resin, phenoxy resin, or a combination thereof. For example, the polyester modified epoxy resin can be CHANKYD 4505-R-40 or CHANKYD 4509-R-40 commercially available from Charng Ruenn Products Co., Ltd. The polyester type polyurethane resin can be CHANKYD 5603-R-50, CHANKYD 5618-R-50, or Envonik VESTI-COAT UB 790-03 commercially available from Charng Ruenn Products Co., Ltd. The phenoxy resin can be bisphenol A phenoxy resin or bisphenol F phenoxy resin. The bisphenol A phenoxy resin can be PKHB, PKHC, PKHH, or PKFE commercially available from U.S. Company INCHEM, or YP-50, YP-505, or YP-70 commercially available from NIPPON STEEL & SUMIKIN CHEMICAL. The bisphenol F phenoxy resin can be FX-316 commercially available from NIPPON STEEL & SUMIKIN CHEMICAL. In the primer paint formulation, the assist resin may have an excellent adhesion with the substrate. The PVF is pushed toward the coating surface by the assist resin during baking the primer paint. After the primer paint including the PVF is baked, the primer coating and the finish coating are tightly combined to achieve an excellent inter-layered adhesion. The disclosure not only measures the adhesion between the coating and the substrate and the inter layered adhesion between the primer coating and the finish coating in dry state, but also measures the above adhesions in a more critical state (e.g. after being treated by boiling water for 2 hours). Too much assist resin will negatively influence the inter layered adhesion between the primer coating and the finish coating, such that the folding endurance of the coating is reduced. Too little assist resin will lower the adhesion between the primer coating and the substrate, lower the adhesion between the coating and the substrate after being treated by boiling water, and lower the inter layered adhesion between the primer coating and the finish coating. The assist resin should simultaneously have an excellent adhesion to the substrate and an excellent toughness, which may make the coating achieve a folding endurance standard of 0 T (no crack).

The latent solvent cannot dissolve the PVF at room temperature, but dissolve a part of the PVF at a temperature over 100° C. For a suitable latent solvent for the PVF please refer to U.S. Pat. Nos. 2,953,818 and 3,139,470. In one embodiment, the latent solvent can be N-methyl-2-pyrrolidone, dimethyl phthalate, propylene carbonate, isophorone, diethyl maleate, triacetin, γ-butyrolactone, or a combination thereof. In one embodiment, the latent solvent is propylene carbonate, or a combination of propylene carbonate and isophorone. Too much latent solvent cannot be completely vaporized from the primer paint in time during baking, such that the finish paint applied on the primer coating easily permeates into the primer coating. As such, the coating has defect such as wrinkle, and the coating efficiency is also lowered. Too little latent solvent will lower the film formability of the coating, thereby degrading the physical and chemical properties of the coating. Thereafter, the primer paint is baked to form the primer coating.

In one embodiment, the surface of the aluminum-zinc alloy coated steel coil is treated by chromic acid, and the primer paint is coil coated thereon. The primer paint is then cured and dried at a peak metal temperature (PMT) of 200° C. to 220° C. for 10 to 30 seconds, thereby baking and drying the primer paint to form the primer coating. The primer coating is then cooled to room temperature, and the finish paint is then applied on the primer coating. It should be understood that the primer coating contains 100 parts by weight of PVF and 20 to 50 parts by weight of the assist resin.

The finish paint includes 100 parts by weight of the PVF and 120 to 150 parts by weight of the latent solvent. Too much latent solvent cannot be completely vaporized from the finish paint in time during baking, and the latent solvent residue in the finish paint will degrade the physical properties of the coating. The baking temperature can be enhanced to completely vaporize the latent solvent, however, it easily causes the yellowing the coating or the pyrolysis of the PVF, thereby lowering the chemical resistance of the coating. Too little latent solvent easily makes the finish coating crack or pulverize, such that the physical properties of the coating are reduced due to the incomplete film formation of the coating. In one embodiment, the finish paint is prepared as indicated below. The PVF resin powder, the latent solvent, another solvent collocated with the latent solvent (optional), another auxiliary agent (optional), pigment (optional), and filler (optional) are mixed together, stirred at a high rate to be evenly dispersed, and then ground by a grinder with a cooling device until the paint has a fineness≤10 µm (this usually takes 4 hours). A solvent other than the latent solvent is optionally (not necessary) added to the paint for tuning the paint viscosity to be suitable in a coil coating process (e.g. 40 to 70 seconds with a No. 4 Ford cup). At last, the paint was filtered by a filtering sieve of 400 mesh. In one embodiment, the PVF and the latent solvent in the finish paint and those in the primer paint are same types with a difference of amounts. Alternatively, the PVF and/or the latent solvent in the finish paint and those in the primer paint are different types.

The finish paint is then baked and dried to form the finish coating on the primer coating. In one embodiment, the step of baking and drying the finish paint can be performed at a PMT of 210° C. to 230° C. for 10 to 30 seconds. The finish coating is then cooled to room temperature to complete a bi-layered coating, It should be understood that the finish coating contains 100 parts by weight of PVF.

In one embodiment, the bi-layered coating has a thickness of 25 µm to 40 µm, and the primer coating has a thickness of 12 µm to 15 µm. An overly thin primer coating will lower the adhesion between the bi-layered coating and the substrate. On the other hand, an overly thick primer coating will lower the inter layered adhesion between the primer coating and the finish coating. The single-layered finish coating has a thickness of 10 µm to 15 µm. An overly thick finish coating easily bubbles during film formation, or has an uneven claw mark on its surface. The finish coating can be repeatedly coated to increase the total thickness of the coating, which has the benefit of increasing the physical and chemical resistance of the total coating.

In one embodiment, the latent solvent can be mixed with another solvent to form a solvent system, and the other solvent includes ethylene glycol monobutylether, butyl carbitol, dipropylene glycol butyl ether, propylene glycol methyl ether acetate (PMA), dibasic ester (DBE), toluene, xylene, trimethyl benzene, 15# solvent, MEK, or a combination thereof. The latent solvent and the other solvent should have a ratio of greater than 6:4. Too little latent solvent will lower the film formability of the coating, which may reduce the physical and chemical properties of the coating.

In the described embodiment, pigment can be further added into the primer paint, the finish paint, or both of them. The pigment can be inorganic color powder with any color, which includes but is not limited to a white powder of titanium oxide, white pearl powder, or zinc sulfide, a black powder of cobalt-copper-manganese oxide, copper-manganese oxide, copper-manganese-iron oxide, or iron oxide, a yellow powder of titanium yellow or bismuth yellow, a green powder of cobalt green or chromium oxide, or a blue powder of cobalt-chromium-aluminum oxide or ultramarine. The color powder can be used individually or in combination to achieve the desired color. The primer paint and the finish paint may utilize a color powder of the same color. Alternatively, the primer paint can be white, gray, or pale yellow, and the finish paint can be a darker color to cover the color of the primer paint. In one embodiment, the total weight of the PVF and the assist resin and the weight of the pigment have a ratio of 10:3 to 10:7 in the primer paint and the primer coating. In one embodiment, the PVF and the pigment have a weight ratio of 10:3 to 10:7 in the finish paint and the finish coating. A coating with too little pigment has a similar effect as one with no pigment added. Too much pigment may reduce the physical properties of the coating, e.g. folding endurance.

In one embodiment, the primer paint and the finish paint may further include another auxiliary agent. The auxiliary agent is not specifically limited, which should not negatively influence the purpose of the disclosure. In one embodiment, the auxiliary agent can be anti-corrosion agent, dispersing agent, anti-blooming agent, anti-foaming agent, thermal stabilizer, or a combination thereof.

Below, exemplary embodiments will be described in detail so as to be easily realized by a person having ordinary knowledge in the art. The inventive concept may be embodied in various forms without being limited to the exemplary embodiments set forth herein. Descriptions of well-known parts are omitted for clarity.

EXAMPLES

The names and the sources of the chemicals in Examples are listed below but are not limited to those.

PVF was Tedlar TPVF 116 powder (solid content=100%) commercially available from DuPont.

Phenoxy resin was PKHH with a solid content of 100% commercially available from U.S. Company INCHEM. In the following Examples, the phenoxy resin solution with a solid content of 30% was used, which could be 30 g of PKHH dissolved in 70 g of propylene glycol methyl ether acetate (PGMEA).

Polyester type polyurethane resin was VESTICOAT UB 790-03 with a solid content of 60% commercially available from EnVoink.

Polyester modified epoxy resin was CHANKYD 4509-R-40 with a solid content of 40% commercially available from Charng Ruenn Products Co., Ltd.

Acrylate resin was Paraloid B-44 with a solid content of 100% commercially available from DOW CHEMICAL. In the following Examples, the acrylate resin solution with a solid content of 40% was used, which could be 40 g of B-44 dissolved in 60 g of toluene.

Epoxy resin was Epikote 1009 powder with a solid content of 100% commercially available from HEXION. In the following Examples, the epoxy resin solution with a solid content of 40% was used, which could be 40 g of Epikote 1009 dissolved in 60 g of PGMEA.

Latent solvent was propylene carbonate commercially available from Shandong Shida Shenghua Chemical Group Co., Ltd. or isophorone commercially available from DOW CHEMICAL.

Solvent was ethylene glycol monobutyl ether commercially available from DOW CHEMICAL or butyl carbitol commercially available from DOW CHEMICAL.

Titanium oxide was TIOXIDE TR-81 commercially available from HUNTSMAN.

Thermal stabilizer was sodium formate commercially available from PERSTORP or Celloxide 2021P epoxy resin commercially available from Japan Company DAICEL.

The dispersing agent was DISPERBYK 111 commercially available from Germany Company BYK.

The anti-blooming agent was CoatOSil 1211 commercially available from U.S. Company MOMENTIVE.

The anti-foaming agent was Airase 8070 Deaerator commercially available from AIR PRODUCT.

The anti-corrosion agent was ZAP-X (Aluminum polyphosphate) commercially available from Shih-Sheng Chemical Industry Co., Ltd.

Coil was an aluminum-zinc alloy coated steel coil having a thickness of 0.426 mm and a surface treated by chromic acid commercially available from Meng Sin Material Co. Ltd.

Example 1

Preparing a primer paint: 70 g of titanium oxide, 140 g of phenoxy resin with a solid content of 30%, 100 g of PVF resin powder, 70 g of propylene carbonate, 80 g of isophorone, 40 g of ethylene glycol monobutyl ether, 20 g of butyl carbitol, 10 g of anti-corrosion agent, and 1.0 g of dispersing agent were mixed together, stirred at a high rate to be evenly dispersed, then ground by a grinder with a cooling device until the paint had a fineness≤10 µm (costing 4 hours), and then filtered by a filtering sieve of 400 mesh to obtain the primer paint.

Preparing a finish paint: 50.0 g of titanium oxide, 100 g of PVF resin powder, 0.8 g of dispersing agent, 130 g of propylene carbonate, 40 g of ethylene glycol monobutyl ether, 0.5 g of thermal stabilizer (composed of 0.47 g of the Celloxide 2021P epoxy resin and 0.03 g of sodium carbonate), 1.0 g of anti-blooming agent, and 1.0 g of anti-foaming agent were mixed together, stirred at a high rate to be evenly dispersed, then ground by a grinder with a cooling device until the paint had a fineness≤10 µm (costing 4 hours), and then filtered by a filtering sieve of 400 mesh to obtain the finish paint.

Preparing a coating: the primer paint was coil coated on the treated coil, then cured and dried at a PMT of 200° C. for 30 seconds, and then cooled to room temperature. A finish paint was then coil coated thereon, then cured and dried at a PMT of 210° C. for 30 seconds, and then cooled to room temperature to obtain the coating.

Example 2

Preparing a primer paint: 84 g of titanium oxide, 33.4 g of polyester type polyurethane resin with a solid content of 60%, 100 g of PVF resin powder, 150 g of propylene carbonate, 40 g of ethylene glycol monobutyl ether, 10 g of anti-corrosion agent, and 1.0 g of dispersing agent were mixed together, stirred at a high rate to be evenly dispersed, then ground by a grinder with a cooling device until the paint had a fineness≤10 µm (costing 4 hours), and then filtered by a filtering sieve of 400 mesh to obtain the primer paint.

Preparing a finish paint: 70.0 g of titanium oxide, 100 g of PVF resin powder, 0.8 g of dispersing agent, 120 g of propylene carbonate, 40 g of ethylene glycol monobutyl ether, 0.5 g of thermal stabilizer (composed of 0.47 g of the Celloxide 2021P epoxy resin and 0.03 g of sodium carbonate), 1.0 g of anti-blooming agent, and 1.0 g of anti-foaming agent were mixed together, stirred at a high rate to be evenly dispersed, then ground by a grinder with a cooling device until the paint had a fineness≤10 μm (costing 4 hours), and then filtered by a filtering sieve of 400 mesh to obtain the finish paint.

Preparing a coating: the primer paint was coil coated on the treated coil, then cured and dried at a PMT of 220° C. for 20 seconds, and then cooled to room temperature. A finish paint was then coil coated thereon, then cured and dried at a PMT of 230° C. for 10 seconds, and then cooled to room temperature to obtain the coating.

Example 3

Preparing a primer paint: 65 g of titanium oxide, 90 g of polyester modified epoxy resin with a solid content of 40%, 100 g of PVF resin powder, 80 g of propylene carbonate, 90 g of isophorone, 30 g of ethylene glycol monobutyl ether, 10 g of butyl carbitol, 10 g of anti-corrosion agent, and 1.0 g of dispersing agent were mixed together, stirred at a high rate to be evenly dispersed, then ground by a grinder with a cooling device until the paint had a fineness≤10 μm (costing 4 hours), and then filtered by a filtering sieve of 400 mesh to obtain the primer paint.

Preparing a finish paint: 60.0 g of titanium oxide, 100 g of PVF resin powder, 0.8 g of dispersing agent, 140 g of propylene carbonate, 40 g of ethylene glycol monobutyl ether, 0.5 g of thermal stabilizer (composed of 0.47 g of the Celloxide 2021P epoxy resin and 0.03 g of sodium carbonate), 1.0 g of anti-blooming agent, and 1.0 g of anti-foaming agent were mixed together, stirred at a high rate to be evenly dispersed, then ground by a grinder with a cooling device until the paint had a fineness≤10 μm (costing 4 hours), and then filtered by a filtering sieve of 400 mesh to obtain the finish paint.

Preparing a coating: the primer paint was coil coated on the treated coil, then cured and dried at a PMT of 200° C. for 30 seconds, and then cooled to room temperature. A finish paint was then coil coated thereon, then cured and dried at a PMT of 210° C. for 20 seconds, and then cooled to room temperature to obtain the coating.

Example 4

Preparing a primer paint: 60 g of titanium oxide, 120 g of polyester modified epoxy resin with a solid content of 40%, 100 g of PVF resin powder, 70 g of propylene carbonate, 80 g of isophorone, 30 g of ethylene glycol monobutyl ether, 20 g of butyl carbitol, 10 g of anti-corrosion agent, and 1.0 g of dispersing agent were mixed together, stirred at a high rate to be evenly dispersed, then ground by a grinder with a cooling device until the paint had a fineness≤10 μm (costing 4 hours), and then filtered by a filtering sieve of 400 mesh to obtain the primer paint.

Preparing a finish paint: 40.0 g of titanium oxide, 100 g of PVF resin powder, 0.8 g of dispersing agent, 130 g of propylene carbonate, 40 g of ethylene glycol monobutyl ether, 0.5 g of thermal stabilizer (composed of 0.47 g of the Celloxide 2021P epoxy resin and 0.03 g of sodium carbonate), 1.0 g of anti-blooming agent, and 1.0 g of anti-foaming agent were mixed together, stirred at a high rate to be evenly dispersed, then ground by a grinder with a cooling device until the paint had a fineness≤10 μm (costing 4 hours), and then filtered by a filtering sieve of 400 mesh to obtain the finish paint.

Preparing a coating: the primer paint was coil coated on the treated coil, then cured and dried at a PMT of 220° C. for 10 seconds, and then cooled to room temperature. A finish paint was then coil coated thereon, then cured and dried at a PMT of 230° C. for 10 seconds, and then cooled to room temperature to obtain the coating.

Example 5

Preparing a primer paint: 48 g of titanium oxide, 83.3 g of polyester type polyurethane resin with a solid content of 60%, 100 g of PVF resin powder, 80 g of propylene carbonate, 80 g of isophorone, 30 g of ethylene glycol monobutyl ether, 20 g of butyl carbitol, 10 g of anti-corrosion agent, and 1.0 g of dispersing agent were mixed together, stirred at a high rate to be evenly dispersed, then ground by a grinder with a cooling device until the paint had a fineness≤10 μm (costing 4 hours), and then filtered by a filtering sieve of 400 mesh to obtain the primer paint.

Preparing a finish paint: 30 g of titanium oxide, 100 g of PVF resin powder, 0.8 g of dispersing agent, 150 g of propylene carbonate, 40 g of ethylene glycol monobutyl ether, 0.5 g of thermal stabilizer (composed of 0.47 g of the Celloxide 2021P epoxy resin and 0.03 g of sodium carbonate), 1.0 g of anti-blooming agent, and 1.0 g of anti-foaming agent were mixed together, stirred at a high rate to be evenly dispersed, then ground by a grinder with a cooling device until the paint had a fineness≤10 μm (costing 4 hours), and then filtered by a filtering sieve of 400 mesh to obtain the finish paint.

Preparing a coating: the primer paint was coil coated on the treated coil, then cured and dried at a PMT of 200° C. for 30 seconds, and then cooled to room temperature. A finish paint was then coil coated thereon, then cured and dried at a PMT of 220° C. for 20 seconds, and then cooled to room temperature to obtain the coating.

The compositions in Examples 1 to 5 are listed in Table 1.

TABLE 1

|  |  | Example 1 | | Example 2 | | Example 3 | |
| --- | --- | --- | --- | --- | --- | --- | --- |
|  |  | Primer paint | Finish paint | Primer paint | Finish paint | Primer paint | Finish paint |
| PVF |  | 100 | 100 | 100 | 100 | 100 | 100 |
| Assist resin | Polyester modified epoxy resin |  |  |  |  | 90 |  |
|  | Polyester type polyurethane resin |  |  | 33.4 |  |  |  |
|  | Phenoxy resin | 140 |  |  |  |  |  |
| Latent solvent | Propylene carbonate | 70 | 130 | 150 | 120 | 80 | 140 |
|  | Isophorone | 80 |  |  |  | 90 |  |

TABLE 1-continued

| Category | Item | | | | | | |
|---|---|---|---|---|---|---|---|
| Solvent | Ethylene glycol monobutyl ether | 40 | 40 | 40 | 40 | 30 | 40 |
| | Butyl carbitol | 20 | | | | 10 | |
| Auxiliary agent | Thermal stabilizer | | 0.5 | | 0.5 | | 0.5 |
| | Dispersing agent | 1 | 0.8 | 1 | 0.8 | 1 | 0.8 |
| | Anti-blooming agent | | 1 | | 1 | | 1 |
| | Anti-foaming agent | | 1 | | 1 | | 1 |
| | Anti-corrosion agent | 10 | | 10 | | 10 | |
| Color powder | Titanium oxide powder | 70 | 50 | 84 | 70 | 65 | 60 |

| | | Example 4 | | Example 5 | |
|---|---|---|---|---|---|
| | | Primer paint | Finish paint | Primer paint | Finish paint |
| PVF | | 100 | 100 | 100 | 100 |
| Assist resin | Polyester modified epoxy resin | 120 | | | |
| | Polyester type polyurethane resin | | | 83.3 | |
| Latent solvent | Propylene carbonate | 70 | 130 | 80 | 150 |
| | Isophorone | 80 | | 80 | |
| Solvent | Ethylene monobutyl ether | 30 | 40 | 30 | 40 |
| | Butyl carbitol | 20 | | 20 | |
| Auxiliary agent | Thermal stabilizer | | 0.5 | | 0.5 |
| | Dispersing agent | 1 | 0.8 | 1 | 0.8 |
| | Anti-blooming agent | | 1 | | 1 |
| | Anti-foaming agent | | 1 | | 1 |
| | Anti-corrosion agent | 10 | | 10 | |
| Color powder | Titanium oxide powder | 60 | 40 | 48 | 30 |

Comparative Example 1

Preparing a primer paint: 70 g of titanium oxide, 100 g of PVF resin powder, 70 g of propylene carbonate, 80 g of isophorone, 40 g of ethylene glycol monobutyl ether, 20 g of butyl carbitol, 10 g of anti-corrosion agent, and 1.0 g of dispersing agent were mixed together, stirred at a high rate to be evenly dispersed, then ground by a grinder with a cooling device until the paint had a fineness≤10 μm (costing 4 hours), and then filtered by a filtering sieve of 400 mesh to obtain the primer paint.

Preparing a finish paint: 50 g of titanium oxide, 100 g of PVF resin powder, 0.8 g of dispersing agent, 130 g of propylene carbonate, 40 g of ethylene glycol monobutyl ether, 0.5 g of thermal stabilizer (composed of 0.47 g of the Celloxide 2021P epoxy resin and 0.03 g of sodium carbonate), 1.0 g of anti-blooming agent, and 1.0 g of anti-foaming agent were mixed together, stirred at a high rate to be evenly dispersed, then ground by a grinder with a cooling device until the paint had a fineness≤10 μm (costing 4 hours), and then filtered by a filtering sieve of 400 mesh to obtain the finish paint.

Preparing a coating: the primer paint was coil coated on the treated coil, then cured and dried at a PMT of 200° C. for 30 seconds, and then cooled to room temperature. A finish paint was then coil coated thereon, then cured and dried at a PMT of 210° C. for 30 seconds, and then cooled to room temperature to obtain the coating. The coating was completely peeled from the substrate in dry state, such that other properties of the coating could not be measured.

Comparative Example 2

Preparing a primer paint: 84 g of titanium oxide, 32.7 g of polyester type polyurethane resin with a solid content of 60%, 100 g of PVF resin powder, 60 g of propylene carbonate, 90 g of isophorone, 30 g of ethylene glycol monobutyl ether, 20 g of butyl carbitol, 10 g of anti-corrosion agent, and 1.0 g of dispersing agent were mixed together, stirred at a high rate to be evenly dispersed, then ground by a grinder with a cooling device until the paint had a fineness≤10 μm (costing 4 hours), and then filtered by a filtering sieve of 400 mesh to obtain the primer paint.

Preparing a finish paint: 70 g of titanium oxide, 100 g of PVF resin powder, 0.8 g of dispersing agent, 120 g of propylene carbonate, 40 g of ethylene glycol monobutyl ether, 0.5 g of thermal stabilizer (composed of 0.47 g of the Celloxide 2021P epoxy resin and 0.03 g of sodium carbonate), 1.0 g of anti-blooming agent, and 1.0 g of anti-foaming agent were mixed together, stirred at a high rate to be evenly dispersed, then ground by a grinder with a cooling device until the paint had a fineness≤10 μm (costing 4 hours), and then filtered by a filtering sieve of 400 mesh to obtain the finish paint.

Preparing a coating: the primer paint was coil coated on the treated coil, then cured and dried at a PMT of 220° C. for 10 seconds, and then cooled to room temperature. A finish paint was then coil coated thereon, then cured and dried at a PMT of 230° C. for 10 seconds, and then cooled to room temperature to obtain the coating.

Comparative Example 3

Preparing a primer paint: 48 g of titanium oxide, 85 g of polyester type polyurethane resin with a solid content of 60%, 100 g of PVF resin powder, 80 g of propylene carbonate, 80 g of isophorone, 30 g of ethylene glycol monobutyl ether, 20 g of butyl carbitol, 10 g of anti-corrosion agent, and 1.0 g of dispersing agent were mixed together, stirred at a high rate to be evenly dispersed, then ground by a grinder with a cooling device until the paint had a fineness≤10 μm (costing 4 hours), and then filtered by a filtering sieve of 400 mesh to obtain the primer paint.

Preparing a finish paint: 30 g of titanium oxide, 100 g of PVF resin powder, 0.8 g of dispersing agent, 150 g of propylene carbonate, 40 g of ethylene glycol monobutyl ether, 0.5 g of thermal stabilizer (composed of 0.47 g of the Celloxide 2021P epoxy resin and 0.03 g of sodium carbonate), 1.0 g of anti-blooming agent, and 1.0 g of anti-foaming agent were mixed together, stirred at a high rate to be evenly dispersed, then ground by a grinder with a cooling device until the paint had a fineness≤10 μm (costing 4 hours), and then filtered by a filtering sieve of 400 mesh to obtain the finish paint.

Preparing a coating: the primer paint was coil coated on the treated coil, then cured and dried at a PMT of 200° C. for 30 seconds, and then cooled to room temperature. A finish paint was then coil coated thereon, then cured and dried at a PMT of 220° C. for 20 seconds, and then cooled to room temperature to obtain the coating.

Comparative Example 4

Preparing a paint: 48 g of titanium oxide, 83.3 g of polyester type polyurethane resin with a solid content of 60%, 100 g of PVF resin powder, 80 g of propylene carbonate, 80 g of isophorone, 30 g of ethylene glycol monobutyl ether, 20 g of butyl carbitol, 10 g of anti-corrosion agent, and 1.0 g of dispersing agent were mixed together, stirred at a high rate to be evenly dispersed, then ground by a grinder with a cooling device until the paint had a fineness≤10 μm (costing 4 hours), and then filtered by a filtering sieve of 400 mesh to obtain the final paint.

Preparing a coating: the final paint was coil coated on the treated coil, then cured and dried at a PMT of 200° C. for 30 seconds, and then cooled to room temperature. The final paint was then coil coated thereon again, then cured and dried at a PMT of 200° C. for 30 seconds, and then cooled to room temperature to obtain the coating.

Comparative Example 5

Preparing a paint: 30 g of titanium oxide, 100 g of PVF resin powder, 0.8 g of dispersing agent, 150 g of propylene carbonate, 40 g of ethylene glycol monobutyl ether, 0.5 g of thermal stabilizer (composed of 0.47 g of the Celloxide 2021P epoxy resin and 0.03 g of sodium carbonate), 1.0 g of anti-blooming agent, and 1.0 g of anti-foaming agent were mixed together, stirred at a high rate to be evenly dispersed, then ground by a grinder with a cooling device until the paint had a fineness≤10 μm (costing 4 hours), and then filtered by a filtering sieve of 400 mesh to obtain the final paint.

Preparing a coating: the final paint was coil coated on the treated coil, then cured and dried at a PMT of 220° C. for 20 seconds, and then cooled to room temperature. The final paint was then coil coated thereon again, then cured and dried at a PMT of 220° C. for 20 seconds, and then cooled to room temperature to obtain the coating. The coating was completely peeled from the substrate in dry state, so that other properties of the coating could not be measured.

Comparative Example 6

Preparing a primer paint: 65 g of titanium oxide, 90 g of acrylate resin B-44 with a solid content of 40%, 100 g of PVF resin powder, 80 g of propylene carbonate, 90 g of isophorone, 30 g of ethylene glycol monobutyl ether, 10 g of butyl carbitol, 10 g of anti-corrosion agent, and 1.0 g of dispersing agent were mixed together, stirred at a high rate to be evenly dispersed, then ground by a grinder with a cooling device until the paint had a fineness≤10 μm (costing 4 hours), and then filtered by a filtering sieve of 400 mesh to obtain the primer paint.

Preparing a finish paint: 60.0 g of titanium oxide, 100 g of PVF resin powder, 0.8 g of dispersing agent, 140 g of propylene carbonate, 40 g of ethylene glycol monobutyl ether, 0.5 g of thermal stabilizer (composed of 0.47 g of the Celloxide 2021P epoxy resin and 0.03 g of sodium carbonate), 1.0 g of anti-blooming agent, and 1.0 g of anti-foaming agent were mixed together, stirred at a high rate to be evenly dispersed, then ground by a grinder with a cooling device until the paint had a fineness≤10 μm (costing 4 hours), and then filtered by a filtering sieve of 400 mesh to obtain the finish paint.

Preparing a coating: the primer paint was coil coated on the treated coil, then cured and dried at a PMT of 200° C. for 30 seconds, and then cooled to room temperature. The finish paint was then coil coated thereon, then cured and dried at a PMT of 210° C. for 20 seconds, and then cooled to room temperature to obtain the coating.

Comparative Example 7

Preparing a primer paint: 65 g of titanium oxide, 90 g of epoxy resin Epikote 1009 with a solid content of 40%, 100 g of PVF resin powder, 80 g of propylene carbonate, 90 g of isophorone, 30 g of ethylene glycol monobutyl ether, 10 g of butyl carbitol, 10 g of anti-corrosion agent, and 1.0 g of dispersing agent were mixed together, stirred at a high rate to be evenly dispersed, then ground by a grinder with a cooling device until the paint had a fineness≤10 μm (costing 4 hours), and then filtered by a filtering sieve of 400 mesh to obtain the primer paint.

Preparing a finish paint: 60.0 g of titanium oxide, 100 g of PVF resin powder, 0.8 g of dispersing agent, 140 g of propylene carbonate, 40 g of ethylene glycol monobutyl ether, 0.5 g of thermal stabilizer (composed of 0.47 g of the Celloxide 2021P epoxy resin and 0.03 g of sodium carbonate), 1.0 g of anti-blooming agent, and 1.0 g of anti-foaming agent were mixed together, stirred at a high rate to be evenly dispersed, then ground by a grinder with a cooling device until the paint had a fineness≤10 μm (costing 4 hours), and then filtered by a filtering sieve of 400 mesh to obtain the finish paint.

Preparing a coating: the primer paint was coil coated on the treated coil, then cured and dried at a PMT of 200° C. for 30 seconds, and then cooled to room temperature. The finish paint was then coil coated thereon, then cured and dried at a PMT of 210° C. for 20 seconds, and then cooled to room temperature to obtain the coating.

The compositions of Comparative Examples 1 to 7 are listed in Table 2.

TABLE 2

|  |  | Comparative Example 1 | | Comparative Example 2 | | Comparative Example 3 | |
| --- | --- | --- | --- | --- | --- | --- | --- |
|  |  | Primer paint | Finish paint | Primer paint | Finish paint | Primer paint | Finish paint |
| PVF |  | 100 | 100 | 100 | 100 | 100 | 100 |
| Assist resin | Polyester type polyurethane resin |  |  | 32.7 |  | 85 |  |
| Latent solvent | Propylene carbonate | 70 | 130 | 60 | 120 | 80 | 150 |
|  | Isophorone | 80 |  | 90 |  | 80 |  |
| Solvent | Ethylene glycol monobutyl ether | 40 | 40 | 30 | 40 | 30 | 40 |
|  | Butyl carbitol | 20 |  | 20 |  | 20 |  |
| Auxiliary agent | Thermal stabilizer |  | 0.5 |  | 0.5 |  | 0.5 |
|  | Dispersing agent | 1 | 0.8 | 1 | 0.8 | 1 | 0.8 |
|  | Anti-blooming agent |  | 1 |  | 1 |  | 1 |
|  | Anti-foaming agent |  | 1 |  | 1 |  | 1 |
|  | Anti-corrosion agent | 10 |  | 10 |  | 10 |  |
| Color powder | Titanium oxide powder | 70 | 50 | 84 | 70 | 48 | 30 |

|  |  | Comparative Example 4 | Comparative Example 5 |
| --- | --- | --- | --- |
| PVF |  | 100 | 100 |
| Assist resin | Polyester type polyurethane resin | 83.3 |  |
| Latent solvent | Propylene carbonate | 80 | 150 |
|  | Isophorone | 80 |  |
| Solvent | Ethylene glycol monobutyl ether | 30 | 40 |
|  | Butyl carbitol | 20 |  |
| Auxiliary agent | Thermal stabilizer |  | 0.5 |
|  | Dispersing agent | 1 | 0.8 |
|  | Anti-blooming agent |  | 1 |
|  | Anti-foaming agent |  | 1 |
|  | Anti-corrosion agent | 10 |  |
| Color powder | Titanium oxide powder | 48 | 30 |

|  |  | Comparative Example 6 | | Comparative Example 7 | |
| --- | --- | --- | --- | --- | --- |
|  |  | Primer paint | Finish paint | Primer paint | Finish paint |
| PVF |  | 100 | 100 | 100 | 100 |
| Assist resin | Acrylate resin | 90 |  |  |  |
|  | Epoxy resin |  |  | 90 |  |
| Latent solvent | Propylene carbonate | 80 | 140 | 80 | 140 |
|  | Isophorone | 90 |  | 90 |  |
| Solvent | Ethylene glycol monobutyl ether | 30 | 40 | 30 | 40 |
|  | Butyl carbitol | 10 |  | 10 |  |
| Auxiliary agent | Thermal stabilizer |  | 0.5 |  | 0.5 |
|  | Dispersing agent | 1 | 0.8 | 1 | 0.8 |
|  | Anti-blooming agent |  | 1 |  | 1 |
|  | Anti-foaming agent |  | 1 |  | 1 |
|  | Anti-corrosion agent | 10 | / | 10 |  |
| Color powder | Titanium oxide powder | 65 | 60 | 65 | 60 |

The properties of the coatings in Examples 1 to 5 and Comparative Examples 1 to 7 were measured by following methods, which are listed in Table 3.

Brightness of the coatings was measured according to American Society for Testing and Materials standard ASTM D523.

Thickness of the coatings was measured according to American Society for Testing and Materials standard ASTM D7091.

Hardness of the coatings was measured according to Japan Industrial Standard JIS K 5400.

Acid resistance of the coatings was measured according to Japan Industrial Standard JIS K 5400.

Alkaline resistance of the coatings was measured according to Japan Industrial Standard JIS K 5400.

MEK resistance of the coatings was measured according to American Society for Testing and Materials standard ASTM D5402.

Folding endurance (T-bend) of the coatings was measured according to American Society for Testing and Materials standard ASTM D4145.

Impact resistance of the coatings was measured according to American Architectural Manufacturers Association standard AAMA_2605-05.

Adhesion between the test plate and the coating and inter layered adhesion of the coating in dry state and after being dipped in boiling water for 2 hours were measured according to American Architectural Manufacturers Association standard AAMA_2605-05 with a difference of the coating being further treated in boiling water for 2 hours to measure the adhesion.

TABLE 3

| Properties | Example 1 | Example 2 | Example 3 | Example 4 | Example 5 |
|---|---|---|---|---|---|
| Film thickness (μm) | 32-35 | 32-35 | 32-35 | 32-35 | 32-35 |
| Brightness | 32° | 37° | 38° | 38° | 45° |
| Adhesion between the substrate and the coating in dry state | 100/100 | 100/100 | 100/100 | 100/100 | 100/100 |
| Inter layered adhesion in dry state | 100/100 | 100/100 | 100/100 | 100/100 | 100/100 |
| Adhesion between the substrate and the coating after being treated in boiling water | 100/100 | 100/100 | 100/100 | 100/100 | 100/100 |
| Inter layered adhesion after being treated in boiling water | 100/100 | 100/100 | 100/100 | 100/100 | 100/100 |
| Folding endurance (T-bend) | 0 T | 0 T | 0 T | 0 T | 0 T |
| Impact resistance | OK | OK | OK | OK | OK |
| Pencil hardness | 2H | 2H | 2H | 2H | 2H |
| MEK scratch resistance | The gloss of the coating was not loss after MEK scratching back and forth 500 times | The gloss of the coating was not loss after MEK scratching back and forth 500 times | The gloss of the coating was not loss after MEK scratching back and forth 500 times | The gloss of the coating was not loss after MEK scratching back and forth 500 times | The gloss of the coating was not loss after MEK scratching back and forth 500 times |
| Acid resistance (5% HCl) | No bubble after being treated by acid for 960 hours | No bubble after being treated by acid for 960 hours | No bubble after being treated by acid for 960 hours | No bubble after being treated by acid for 960 hours | No bubble after being treated by acid for 960 hours |
| Acid resistance (10% $H_2SO_4$) | No bubble after being treated by acid for 1440 hours | No bubble after being treated by acid for 1440 hours | No bubble after being treated by acid for 1440 hours | No bubble after being treated by acid for 1440 hours | No bubble after being treated by acid for 1440 hours |
| Alkaline resistance (10% NaOH) | No bubble after being treated by alkaline for 1440 hours | No bubble after being treated by alkaline for 1440 hours | No bubble after being treated by alkaline for 1440 hours | No bubble after being treated by alkaline for 1440 hours | No bubble after being treated by alkaline for 1440 hours |

| Properties | Comparative Example 1 | Comparative Example 2 | Comparative Example 3 | Comparative Example 4 | Comparative Example 5 | Comparative Example 6 | Comparative Example 7 |
|---|---|---|---|---|---|---|---|
| Film thickness (μm) | 32-25 | 32-35 | 30-32 | 28-30 | 25-30 | 32-35 | 32-35 |
| Brightness | 35° | 37° | 33° | 40° | 42° | 35° | 40° |
| Adhesion between the substrate and the coating in dry state | 0/100 | 100/100 | 100/100 | 100/100 | 0/100 | 100/100 | 100/100 |
| Inter layered adhesion in dry state | / | 100/100 | 90/100 | / | / | 100/100 | 100/100 |
| Adhesion between the substrate and the coating after being treated in boiling water | / | 90/100 | 100/100 | 50/100 | / | 0/100 | 0/100 |

TABLE 3-continued

| | | | | | | | |
|---|---|---|---|---|---|---|---|
| Inter layered adhesion after being treated in boiling water | / | 70/100 | 60/100 | / | / | / | / |
| Folding endurance (T-bend) | / | 0 T | 1 T | 2 T | / | 2 T | 1 T |
| Impact resistance | / | OK | OK | OK | / | OK | OK |
| Pencil hardness | / | 2H | 2H | 3H | / | 2H | 2H |
| MEK scratch resistance | / | The gloss of the coating was not loss after MEK scratching back and forth 500 times | The gloss of the coating was not loss after MEK scratching back and forth 500 times | The gloss of the coating was not loss after MEK scratching back and forth 500 times | The gloss of the coating was not loss after MEK scratching back and forth 500 times | The gloss of the coating was not loss after MEK scratching back and forth 500 times | The gloss of the coating was not loss after MEK scratching back and forth 500 times |
| Acid resistance (5% HCl) | / | No bubble after being treated by acid for 960 hours | No bubble after being treated by acid for 960 hours | / | / | / | / |
| Acid resistance (10% $H_2SO_4$) | / | No bubble after being treated by acid for 1440 hours | No bubble after being treated by acid for 1440 hours | / | / | / | / |
| Alkaline resistance (10% NaOH) | / | No bubble after being treated by alkaline for 1440 hours | No bubble after being treated by alkaline for 1440 hours | / | / | / | / |

While the disclosure has been described by way of example and in terms of the preferred embodiments, it should be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A polyvinyl fluoride paint, comprising:
100 parts by weight of a polyvinyl fluoride, 20 to 50 parts by weight of an assist resin, and 150 to 170 parts by weight of a latent solvent,
wherein the assist resin is polyester modified epoxy resin, polyester modified polyurethane resin, phenoxy resin, or a combination thereof.

2. The polyvinyl fluoride paint as claimed in claim 1, further comprising a pigment, and a total weight of the polyvinyl fluoride and the assist resin and a weight of the pigment have a ratio of 10:3 to 10:7.

3. The polyvinyl fluoride paint as claimed in claim 1, wherein the latent solvent comprises N-methyl-2-pyrrolidone, dimethyl phthalate, propylene carbonate, isophorone, diethyl maleate, triacetin, γ-butyrolactone, or a combination thereof.

4. A bi-layered coating, comprising:
a primer coating including 100 parts by weight of a first polyvinyl fluoride and 20 to 50 parts by weight of an assist resin, and
a finish coating including 100 parts by weight of a second polyvinyl fluoride,
wherein the assist resin is polyester modified epoxy resin, polyester modified polyurethane resin, phenoxy resin, or a combination thereof.

5. The bi-layered coating as claimed in claim 4, wherein the primer coating further comprises a first pigment, and a total weight of the first polyvinyl fluoride and the assist resin and a weight of the first pigment have a ratio of 10:3 to 10:7.

6. The bi-layered coating as claimed in claim 4, wherein the finish coating further comprises a second pigment, and the second polyvinyl fluoride and the second pigment have a ratio of 10:3 to 10:7.

7. A method of forming a bi-layered coating, comprising:
applying a primer paint on a substrate, wherein the primer paint includes 100 parts by weight of a first polyvinyl fluoride, 20 to 50 parts by weight of an assist resin, and 150 to 170 parts by weight of a first latent solvent, and wherein the assist resin is polyester modified epoxy resin, polyester modified polyurethane resin, phenoxy resin, or a combination thereof;
baking and drying the primer paint to form a primer coating;
applying a finish paint on the primer coating, wherein the finish paint includes 100 parts by weight of a second polyvinyl fluoride and 120 to 150 parts by weight of a second latent solvent; and
baking and drying the finish paint to form a finish coating on the primer coating.

8. The method as claimed in claim 7, wherein the primer paint further comprises a first pigment, and a total weight of the first polyvinyl fluoride and the assist resin and a weight of the first pigment have a ratio of 10:3 to 10:7.

9. The method as claimed in claim 7, wherein the finish paint further comprises a second pigment, and the second polyvinyl fluoride and the second pigment have a ratio of 10:3 to 10:7.

10. The method as claimed in claim 7, wherein each of the first latent solvent and the second latent solvent independently comprises N-methyl-2-pyrrolidone, dimethyl phthalate, propylene carbonate, isophorone, diethyl maleate, triacetin, γ-butyrolactone, or a combination thereof.

* * * * *